United States Patent [19]
Sakai et al.

[11] Patent Number: 5,831,961
[45] Date of Patent: Nov. 3, 1998

[54] INFORMATION PROCESSING APPARATUS WITH PROBE UNDERGOING CIRCULAR MOTION

[75] Inventors: Kunihiro Sakai, Isehara; Katsunori Hatanaka, Yokohama; Takahiro Oguchi, Yamato; Akihiko Yamano; Shunichi Shido, both of Sagamihara, all of Japan

[73] Assignee: Canon Kabushiki Kaisha, Tokyo, Japan

[21] Appl. No.: 603,890

[22] Filed: Feb. 22, 1996

[30] Foreign Application Priority Data

Feb. 23, 1995 [JP] Japan .................................. 7-059716

[51] Int. Cl.$^6$ ................................................. G11B 7/00
[52] U.S. Cl. ........................................ 369/126; 250/306
[58] Field of Search ............................... 369/126, 47, 48, 369/54, 58; 250/306, 307

[56] References Cited

U.S. PATENT DOCUMENTS

| | | | |
|---|---|---|---|
| 4,831,614 | 5/1989 | Duerig et al. ............................. | 369/101 |
| 5,117,110 | 5/1992 | Yasutake .................................. | 250/306 |
| 5,251,200 | 10/1993 | Hatanaka et al. ....................... | 369/126 |
| 5,287,342 | 2/1994 | Kishi et al. ............................. | 369/126 |
| 5,323,375 | 6/1994 | Ihara et al. ............................. | 369/126 |
| 5,329,122 | 7/1994 | Sakai et al. ............................. | 250/306 |
| 5,371,727 | 12/1994 | Shido et al. ............................. | 369/124 |
| 5,485,451 | 1/1996 | Yamano et al. ......................... | 369/126 |

FOREIGN PATENT DOCUMENTS

| | | |
|---|---|---|
| 0397116 | 11/1990 | European Pat. Off. . |
| 0516380 | 12/1992 | European Pat. Off. . |
| 0531779 | 3/1993 | European Pat. Off. . |
| 55-047570 | 4/1980 | Japan . |
| 60-047958 | 3/1985 | Japan . |
| 62-281138 | 12/1987 | Japan . |
| 63-161552 | 7/1988 | Japan . |
| 63-262553 | 7/1988 | Japan . |
| 10006919 | 1/1989 | Japan . |

OTHER PUBLICATIONS

"Surface Studies by Scanning Tunneling Microscopy" by G.Binning et al.; Physical Review Letters, vol. 49, No. 1 Jul. 5, 1982, pp. 57–61.

*Primary Examiner*—Muhammad N. Edun
*Attorney, Agent, or Firm*—Fitzpatrick, Cella, Harper & Scinto

[57] ABSTRACT

In an information processing apparatus, at least one of recording and reproduction of information is performed while two-dimensionally scanning a recording medium with a probe, utilizing a physical phenomenon occurring between the probe and the medium. The apparatus includes a scanning mechanism for effecting relative movement between the probe and the medium so as to translate the probe as drawing a circular or elliptic locus on the medium and a recording and/or reproducing circuit for performing at least one of the recording and reproduction of information, utilizing the physical phenomenon during the relative movement.

9 Claims, 7 Drawing Sheets

INFORMATION PROCESSING APPARATUS WITH PROBE UNDERGOING CIRCULAR MOTION

BACKGROUND OF THE INVENTION

1. Field of the Invention

The present invention relates to an information processing apparatus for performing high-density recording and/or reproduction of information, utilizing the principle of scanning probe microscope.

2. Related Background Art

Recently, applications of memory materials are the core of electronics industries including computers and related devices thereto, video disks, and digital audio disks, and development of the materials is also very vivid.

The majority of conventional memories were magnetic memories and semiconductor memories using magnetic and semiconductor materials, but with progress of laser technology cheap and high-density recording media are coming along as optical memories using an organic thin film of an organic dye, a photopolymer, or the like.

Further, recently developed was the scanning tunnel microscope (hereinafter referred to as STM), which was able to directly observe an electron structure of atoms in a sample surface with extremely high resolution (in the order of manometer or less) (G. Binnig et al., Phys. Rev. Lett., 49 (1982) 57). Development is active to put to practical use a memory system capable of performing super-high-density recording and/or reproduction in the atomic or molecular size, utilizing the principle of STM.

The STM utilizes the fact that a tunnel current flows depending upon a voltage applied between a probe tip and a medium surface when a probe electrode is brought to the distance of about 1 or less nm to the medium surface. This current is very sensitive to a change of the distance between them. It can read even various information on total electron cloud in the real space by scanning with the probe as keeping the tunnel current constant.

Analysis with the STM is now being applied not only to analysis of electrically conductive materials, but also to structural analysis of a thin insulating film formed on a surface of a conductive material. Further, attempt is recently made to observe surface structure or to measure a local, physical amount, utilizing various physical phenomena (interatomic force, magnetic force, etc.) occurring between the probe and the medium surface, without being limited to the current.

The STM family of these kinds is called as a scanning probe microscope (SPM) because scanning is made with a micro-probe.

In either case, the resolution in the in-plane direction is of nanometer to subnanometer. The super-high-density memory as described above employs this extremely high space resolution, in which information is recorded by giving physical deformation on the recording medium or a change of electron state in the medium surface and from which information is reproduced by scanning with the probe.

For example, when a pulse voltage (for example, of crest value 3 to 8 V and pulse width 1 to 100 $\mu$s) is applied between the medium and the probe, recording bits can be formed in the form of micro-holes (for example, in the diameter of about 4 nm) on a graphite surface or in the form of micro-projections (for example, in the diameter of about 10 nm) on a surface of a metal such as Au. Japanese Laid-open Patent Application No. 63-161552, Japanese Laid-open Patent Application No. 63-161553, etc. disclose the method for recording and/or reproducing information with the STM using as-a recording layer a material having a memory effect to switching characteristics of conductivity change, for example a thin film layer of one out of $\pi$-electron group organic compounds and chalcogenides.

This method allows high-density and large-capacity recording and/or reproduction even of 1 Tera bits/cm$^2$ when the bit size of recording is 10 nm. Further, there is a supporting and displacing mechanism of probe electrode in the cantilever shape (Japanese Laid-open Patent Application No. 62-281138), which enables a lot of probe units to be fabricated and integrated on a Si substrate in which writing and reading circuits are preliminarily formed.

However, an attempt to raise the speed of probe scanning by increasing scanning frequency using the conventional scanning mechanism as it is will result in a problem that influence of resonance at a resonant point of the scanning mechanism becomes unignorable.

Namely, for forming the SPM or recording and/or reproducing apparatus as an actual apparatus, the apparatus needs to have a mechanism for maintaining the distance between the recording medium and the probe electrode so as to keep the tunnel current flow and relatively moving (scanning) the probe electrode to the recording medium. The scanning mechanism of probe electrode conventionally used is a stage constructed of parallel plate springs and a laminate piezoelectric device, or a cylindrical piezoelectric device having divided electrodes.

Such conventional apparatus needs to raise the scanning frequency in order to increase the recording or reproducing speed of data. Because of it, particularly when two-dimensional scanning is carried out in the X, Y directions, there are cases that resonance of the scanning mechanism or the probe support mechanism is caused by high-order frequency components generated by repetitions of reciprocal scanning in the X-axis direction (in the main scanning direction) having high scanning frequency. This vibration modulates a gap between the medium and the probe or scanning displacement, which becomes a cause of recording and/or reproducing errors due to misreading of detection signal intensity or recording bit position.

For example, the scanning mechanism using the parallel springs and laminate piezoelectric device has the resonance frequency of about 1 to 8 kHz in the case of the arrangement normally used in the SPM.

In this case, the maximum scanning frequency operable without influence of resonant point on an image of SPM is between about 10 and 100 Hz.

In the case of the scanning mechanism using the cylindrical piezoelectric device, which permits a weight reduction of a moving part, the resonance frequency is between 10 and 50 kHz, and the maximum scanning frequency is between about 100 and 300 Hz.

When the above scanning mechanisms are applied to the recording apparatus, though depending upon products applied, the scanning frequency of at least 5 kHz is necessary for obtaining the bit rate of 1 Mbps. Therefore, efforts have been made to decrease the effect of resonance of the scanning mechanism, for example to raise the resonance frequency by enhancing rigidity by further compactification and weight reduction of the scanning mechanism or to decrease Q value of resonance by adding a damping mechanism.

There was a limit on such countermeasures, an d the influence of resonance was a big problem in achieving higher scanning frequency.

SUMMARY OF THE INVENTION

It is, therefore, an object of the present invention to provide an information processing apparatus that can perform stable recording and/or reproduction even during high-frequency drive of the scanning mechanism, solving the above problem.

The above object is achieved by an information processing apparatus which performs at least one of recording and reproduction of information while two-dimensionally scanning a recording medium with a probe, utilizing a physical phenomenon occurring between the probe and the medium, comprising:

a scanning mechanism for effecting relative movement between said probe and said medium so as to translate said probe as drawing a circular or elliptic locus on the medium; and a recording and/or reproducing circuit for performing at least one of the recording and reproduction of information, utilizing the physical phenomenon during the relative movement.

The details will be explained in the description of the embodiments to follow.

DETAILED DESCRIPTION OF THE PREFERRED EMBODIMENTS

The present invention enables the scanning mechanism to perform stable and high-speed probe scanning by composite operation of a circular or elliptic motion with a translational motion thereof.

The present invention can prevent information from being repetitively recorded in or reproduced from a same region in such a manner that recording or reproduction is carried out in either one of a going path and a return path as to an X-axis component of the circular motion, that is, as to simple harmonic oscillation (reciprocal motion) in the main scanning direction, in the-circular motion.

If the circular motion is carried out at equiangular velocity, a probe moving amount per unit time is constant, which facilitates control of probe position on the time axis. Namely, since a change amount of position is in proportion to the time, the probe position can be kept track of by simply counting a clock of constant frequency in accordance with the duration of probe movement, for example.

As for recording and reproduction, the recording operation is carried out at constant time intervals by uniform scanning so as to form recording bits at equal intervals on the medium, and upon reproduction the bits of information aligned at equal intervals on the medium can be read out at constant time intervals.

Further, since the scanning locus does not have any quick speed change portion or any return point, which was a problem in the case of the linear reciprocal scanning of the conventional probe, the invention can prevent occurrence of resonant oscillation, which is likely to occur at such a quick velocity change portion.

The present invention will be explained in further detail, using the embodiments thereof.

[Embodiment 1]

Figure 1:
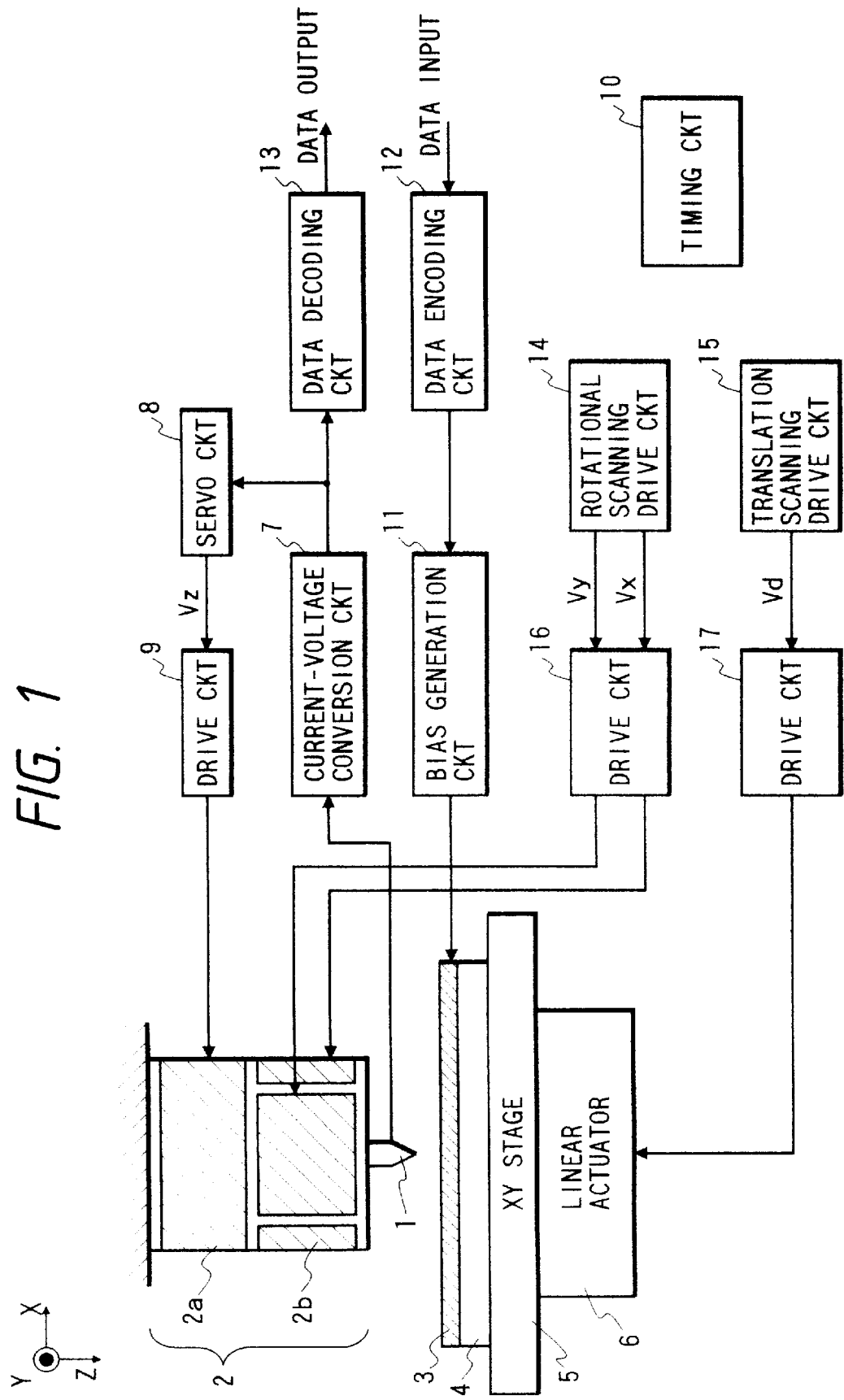
FIG. 1 is a block diagram to show a setup of a recording and/or reproducing apparatus in Embodiment 1 of the present invention.
Figure 2:
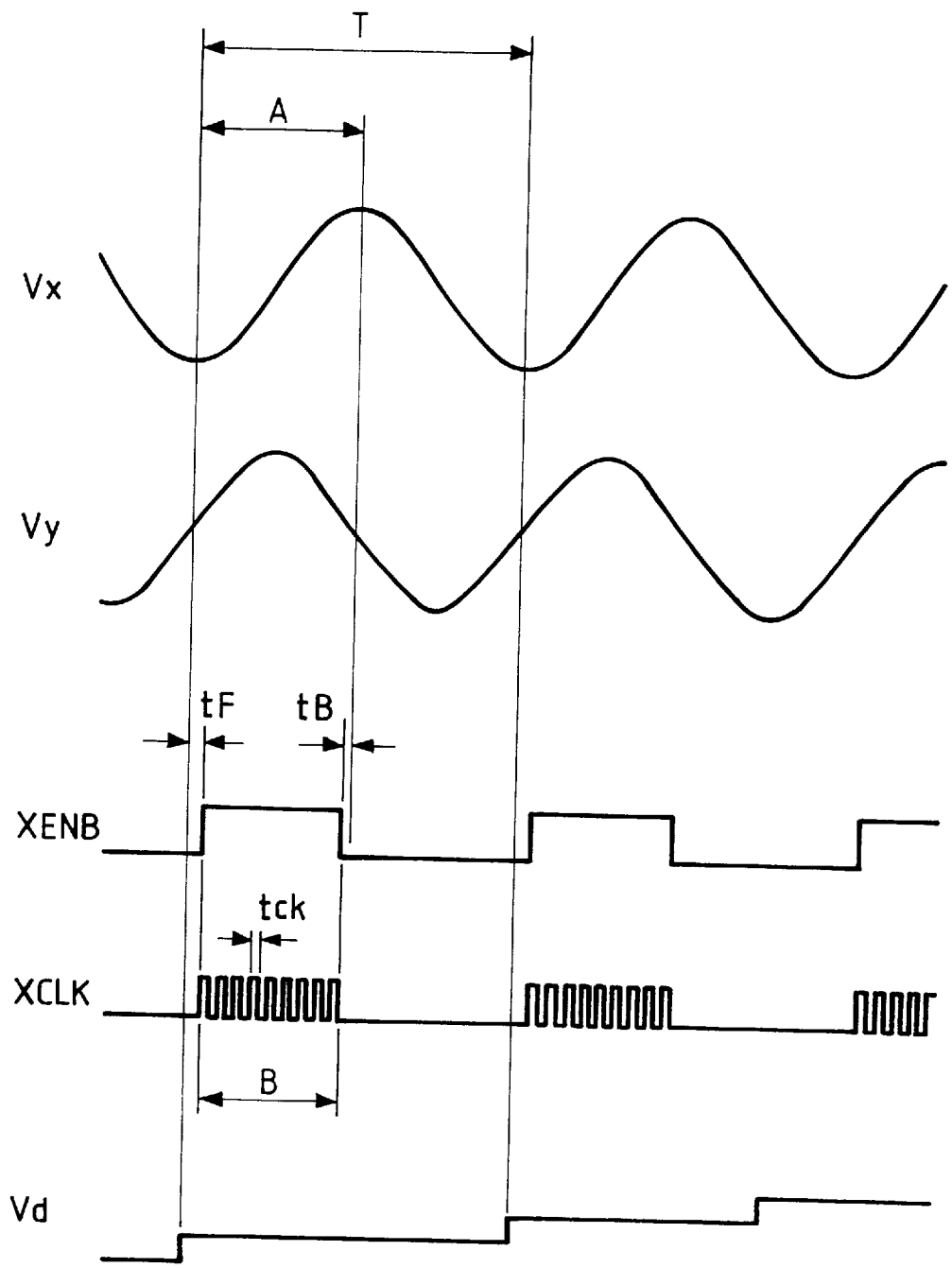
FIG. 2 is a signal diagram to explain operation of a rotational scanning drive circuit in Embodiment 1 of the present invention.
Figure 3:
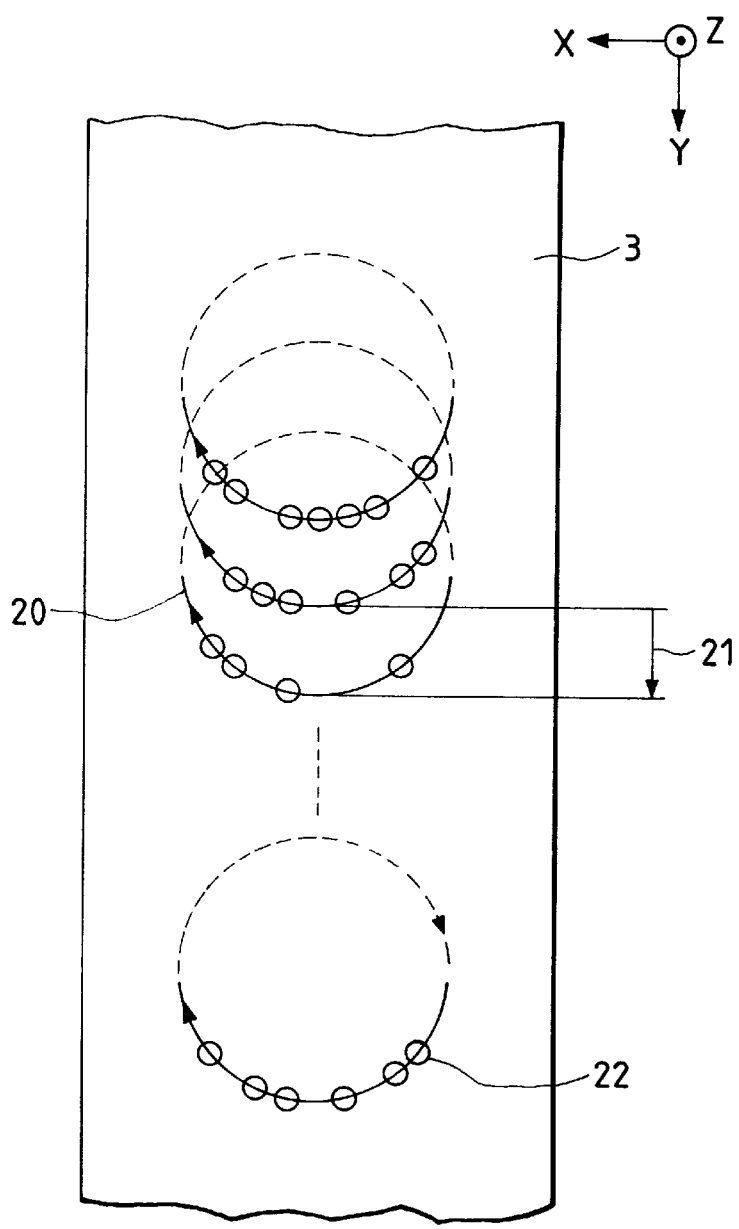
FIG. 3 is a conceptual drawing to show a locus of probe scanning on the recording medium in Embodiment 1 of the present invention.

FIG. 1 is a schematic, structural drawing of the recording and/or reproducing apparatus associated with Embodiment 1 of the present invention, FIG. 2 is a waveform diagram to show signals obtained in a rotational scanning drive circuit portion, and FIG. 3 is an explanatory drawing to show a state of probe scanning.

First explained in detail are constituent elements of the recording and/or reproducing apparatus shown in FIG. 1.

In the drawing, reference numeral 1 designates a probe, and 2 a cylindrical piezoelectric device.

The cylindrical piezoelectric device 2 having divided electrodes is composed of a Z-directional drive section 2a and an XY-direction drive section 2b.

The Z-direction drive section 2a is connected to a drive circuit 9, and moves the probe electrode 1 in the direction of the Z-axis as illustrated in accordance with a signal Vz sent from a servo circuit 8.

Similarly, the XY-direction drive section 2b is connected to a drive circuit 16, and moves the probe in the direction of the X-axis and in the direction of the Y-axis as illustrated in accordance with output signals Vx, Vy from a rotational scanning drive circuit 14.

Numeral 5 denotes an XY stage. A linear actuator 6 is driven by a drive circuit 17 to move the XY stage 5 in the X- and Y-axis directions in accordance with an output signal from a translational scanning drive circuit 15.

A recording medium 3 formed on a substrate 4 is mounted on the XY stage 5.

Further, numeral 7 represents a current-voltage conversion circuit, 8 a servo circuit, and 9 a drive circuit.

The current-voltage conversion circuit 7 detects a current I flowing between the probe electrode 1 and the recording medium 3 to convert it into a voltage signal V.

The servo circuit 8 performs predetermined arithmetic using the voltage signal V to calculate a drive voltage Vz, and the drive circuit 9 dc-amplifies the signal and outputs the amplified signal to the piezoelectric device 2. Further, numeral 11 stands for a bias generation circuit, 12 for a data encoding circuit, and 13 for a data decoding circuit.

The bias circuit 11 generates a reading bias voltage Vb or a recording pulse voltage Vp in accordance with a control signal from a timing circuit 10 to apply a desired voltage to the recording medium 3.

The data encoding circuit 12 encodes recording data D sent from the outside and controls the bias generation circuit 11, based on the timing controlled by the timing circuit 10. The data decoding circuit 13 decodes the recording data D recorded in the recording medium 3 from the voltage signal V sent from the current-voltage conversion circuit 7 to output data decoded to the outside.

Further, numeral 10 denotes a timing circuit, 14 a rotational scanning drive circuit, and 15 a translational scanning drive circuit.

The rotational scanning drive circuit 14 and translational scanning drive circuit 15 are circuits for generating respective drive waveforms for probe scanning, which operate in synchronization with a reference clock generated by the timing circuit 10.

The reference clock is set near the natural frequency of the piezoelectric device 2. Writing or reading of data is also carried out in synchronization with the control signal from the timing circuit 10.

The operation of the recording and/or reproducing apparatus is next explained referring to FIG. 1, FIG. 2, and FIG. 3. As keeping constant the distance between the probe 1 and the surface of the recording medium 3 by the output signal Vz from the servo circuit 8, the probe 1 scans the recording medium 3 in parallel therewith by displacement of the XY-direction drive section 2b of piezoelectric device 2 and the linear actuator 6. Specifically, the rotational scanning drive circuit 14 outputs sinusoidal waves with the phase shift of $\pi/2$, as shown in FIG. 2, as signal Vx and signal Vy so as to apply Vx and Vy to the segmental electrode for X-axis scanning and the segmental electrode for Y-axis scanning, respectively, of the piezoelectric device 2.

As a result, a probe scanning locus 20 becomes circular as shown in FIG. 3. Here, the frequency of the sinusoidal waves is 12.5 kHz (the period T=8 ms) close to the natural frequency (approximately 13 kHz) of the piezoelectric device. The output signal Vd to the linear actuator is changed stepwise in the period T to translate the XY stage 5 in the Y-axis direction, thereby changing the probe position as shown by the arrow 21 in FIG. 3.

Since probe loci of adjacent circular motions overlap with each other, the duration for generation of recording bits or for reading of recording data is preferably determined within about a semicircle of rotational scanning. A more preferred duration is not more than a semicircle (not more than T/2). Here, signal XENB becomes active inside the timing circuit 10 during duration B which is a duration obtained by subtracting the head and tail durations of tF and tB from duration A in which Vx is monotonously increasing, thereby generating clock XCLK (of period tCK) for recording or reproducing processing. The stepwise displacement of the XY stage 5 by translational scanning is carried out while XENB is not active.

Recording of information is based on a method for detecting that the probe 1 reaches a desired position on the recording medium 3 by probe scanning, from a signal from the timing circuit 10, applying a voltage between the probe and the medium in synchronization with clock XCLK as described above to electrically process the recording medium 3, and thereby forming a recording pit 22 corresponding to encoded recording data D. Reproduction of information is carried out by measuring a physical phenomenon occurring when the probe approaches the medium.

In this example, specifically, the recording medium 3 is the SOAZ dye organic thin film (double-layered film) laminated on a gold electrode, which is the recording medium disclosed in Japanese Laid-open Patent Application No. 63-161552 and Japanese Laid-open Patent Application No. 63-161553, recording bits are written on the medium by a pulse voltage generated by the bias generation circuit 11, and a probe current is detected as a voltage signal by the current-voltage conversion circuit 7 to reproduce the data.

When the above apparatus is used for recording or reproduction, the recording bits are continuously formed at equal time intervals tCK. When rotational scanning is carried out at equal velocity, a distance between recording bits is expressed by $2 \cdot R \cdot \sin(\pi \cdot tCK/T)$.

For example, when R=0.5 $\mu$m, T=8 ms, and tCK=25 $\mu$s, the recording bits were formed at intervals of about 10 nm. Since the recording bits are formed at equal intervals on the medium, signals corresponding to the recording bits in the detection signal upon reproduction have equal time intervals. This facilitates control of the probe position and enables to improve S/N ratios by a simple electric circuit in case of performing filtering of detection signal.

Further, the above apparatus was used to observe Z-directional changes of the probe due to parasitic oscillation as performing probe scanning over the medium surface in which no recording bit was formed, and the changes were below the detection limit even with the high-speed probe scanning at repetition frequency 12.5 kHz.

It is noted as to the rotational motion that the oscillation in the X-axis direction does not always have to be exactly equal to that in the Y-axis direction.

Namely, the effect of the present invention can be achieved by an elliptic motion. Further, the above embodiment showed the example of linear translational motion, but it is a matter of course that a translational motion may be defined along a curve with sufficiently larger curvature than that of rotational scanning. For example, the present invention can be applied to a case in which the recording medium is a disk in the radius of the mm or cm order, recording regions are formed concentrically around the center point of the disk, and the translational motion is performed along the Y-axis of the circumferential direction. Further, the translational motion is not limited to the stepwise displacement, but may be a continuous displacement.

Figure 4:
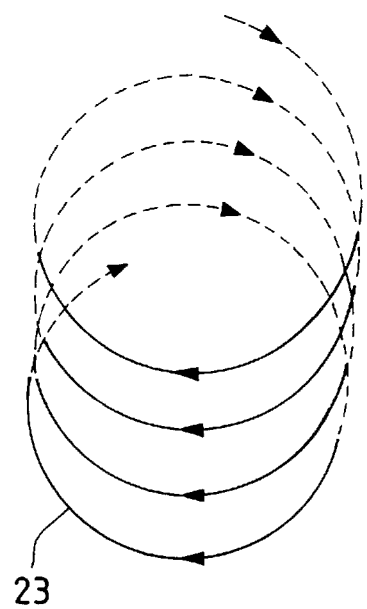
FIG. 4 is a conceptual drawing to show a probe locus when rotational scanning and translational scanning is continuously carried out in Embodiment 1 of the present invention.

In this case the locus of probe scanning based on composition of rotation and translation is as shown in FIG. 4. In the drawing, the solid lines represent scanning loci in durations where recording or reproduction is carried out, while dashed lines represent those during durations where no recording or reproduction is carried out. The translational motion may be any motion that can update a region of rotational scanning, and is not limited by direction or mechanism.

The above embodiment was so arranged that the recording bits were formed by application of voltage and were read out by the probe current (tunnel current etc.), but the probe scanning mechanism as described above can be readily applied to another method, for example to a case where the recording bits are formed as indentations by pressing the probe against the medium or by changing the shape of the medium with a light beam and where an acting force (interatomic force) between the probe and the medium is measured to read out the recording bits. It is noted that the methods or means for recording and reproducing the information do not limit the present invention at all as long as the apparatus is a super-high density recording and/or reproducing apparatus using the probe.

[Embodiment 2]

Figure 5:
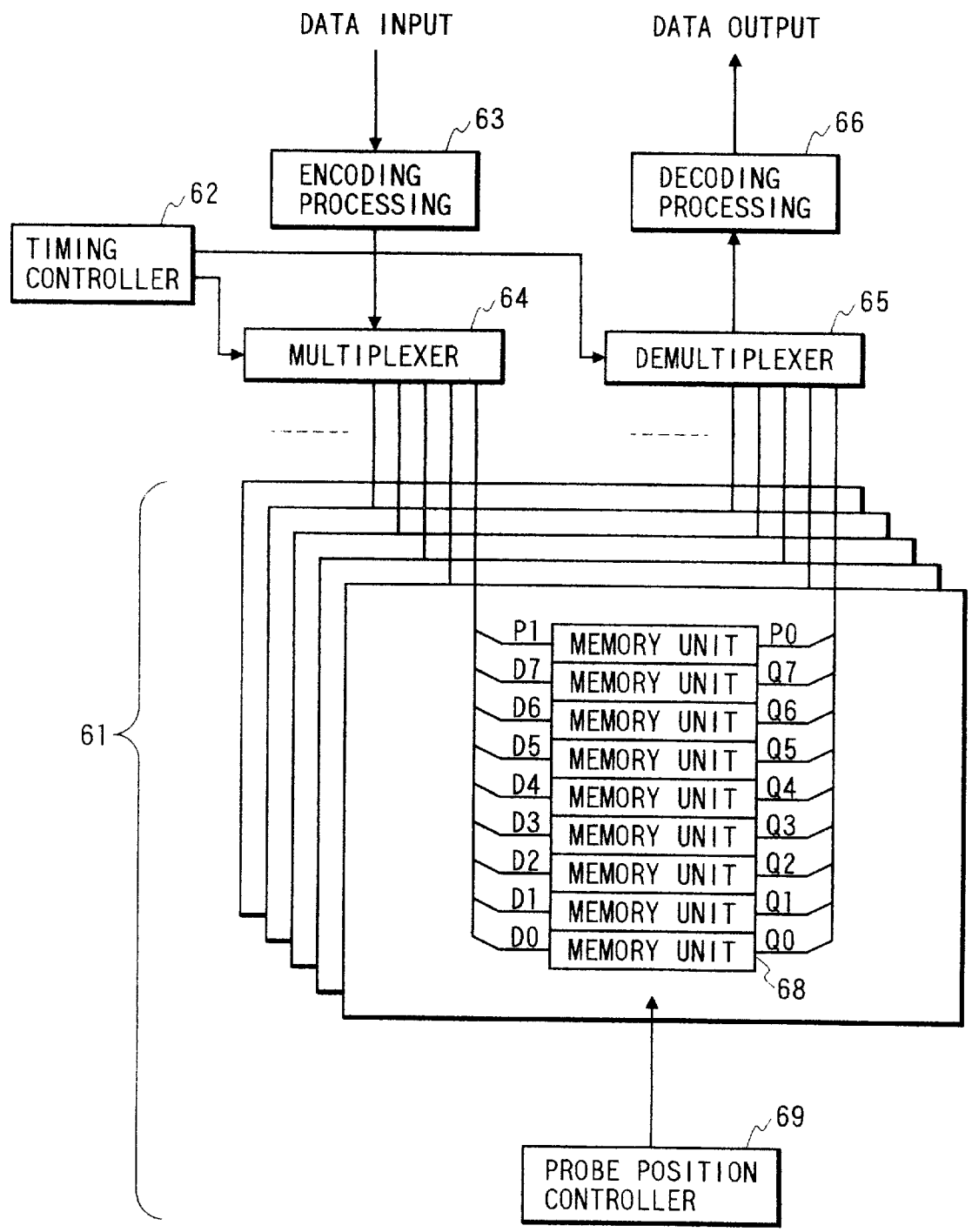
FIG. 5 is a block diagram to show a setup of a recording and/or reproducing apparatus in Embodiment 2 of the present invention.

FIG. 5 is a block diagram to show the schematic structure of the recording and/or reproducing apparatus as Embodiment 2 of the present invention.

Reference numeral 61 is a memory block for storing input data, and the detailed structure thereof will be described later referring to FIG. 6. Numeral 63 denotes a circuit for processing input data into coded signals, 64 a multiplexer, 65 a demultiplexer, 66 a decoding processing circuit for decoding coded signals, 68 a unit of memory forming the memory block, and 69 a circuit for controlling probe scanning to output signals for rotational scanning and translational motion to the drive mechanism.

Data input is subjected to encoding processing by the encoding processing circuit 63, and thereafter encoded data is divided by the multiplexer 64 to be recorded and stored in predetermined memory units in the memory block 61.

Upon reproduction the data is changed back into the original, continuous data sequence by the demultiplexer 65, and thereafter the data is output through the decoding processing circuit 66. To handle with continuous data in real time, the both input and output portions of data, i.e., the encoding processing circuit 63 and the decoding processing circuit 66, are provided with a buffer function to avoid data losses during dead time (for example, the time of movement of the probe above a track or above a non-recorded region) resulting from the mechanism in the process of recording or reproduction by probe scanning.

The multiplexer 64 and demultiplexer 65 both are controlled by a timing controller 62.

The memory block 61 has a feature of performing recording or reproduction of information at desired positions or regions on the recording medium with scanning probes. The present embodiment employs the memory block the structure of which is shown in FIG. 6. The memory block is next explained referring to FIG. 6. In the drawing, a plurality of probe electrodes 71 each are supported by their cantilevers 72 of an elastic body, and are located in the proximity of the recording medium 73.

Each memory unit is composed of a pair of probe electrode 71 and recording medium 73 opposed to each other. The recording medium 73 is formed on a support substrate 74, and guide grooves 75 for selection of recording region and for tracking upon scanning are provided on the surface thereof. A probe position controller 69 is connected to drive elements 77, 78 of a piezoelectric member, and is a circuit for displacing a stage 79, on which a probe unit substrate is mounted, and for controlling the gap (Z-directional distance) between the probe and the medium and the probe scanning (the movement and position in the X, Y directions). The details of stage scanning will be explained later using FIG. 7 and FIG. 8. Recording and reproduction of data is carried out in the same manner as in Embodiment 1.

In more detail, the recording medium 73 is the SOAZ dye organic thin film (double-layered film) laminated on a gold electrode, which is the recording medium disclosed in Japanese Laid-open Patent Applications No. 63-161552 and No. 63-161553, recording bits are written on the medium by a pulse voltage generated by a voltage applying circuit 83, and probe currents are detected to reproduce the recorded data through a changeover circuit 80 and a waveform shaping circuit 81.

Values of the probe currents are also input as Z-directional position control information into the probe position controller 69. The timing controller 82 is connected to the probe position controller 69, the voltage application circuit for recording and reproduction 83, and the changeover circuit 80, and controls time division of data and allocation of recording signals to the respective probes.

The multiple probe units of a lever shape including the probe electrodes, used herein, are produced in the following manner. A $SiO_2$ film is formed by thermal oxidation in the thickness of 0.3 $\mu$m on the surface of Si substrate, and patterning is carried out to form a plurality of levers 100 $\mu$m long and 20 $\mu$m wide. Next, wiring patterns for electric signals to the probe electrodes are formed, and anisotropic etching is effected with KOH solution from the back face of substrate, thereby forming the cantilevers. Subsequently, probe electrodes 71 7 $\mu$m high are formed at tips of levers by the electron beam deposition process of carbon or the like, thus forming multiple probe units on the probe unit substrate 76.

Figure 7:
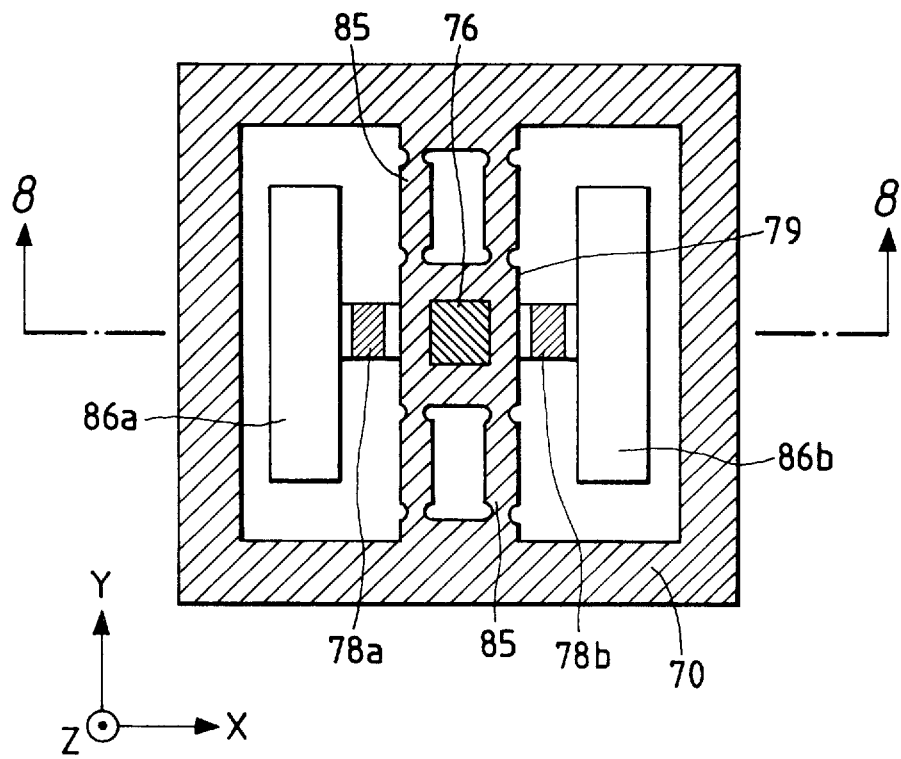
FIG. 7 is a plan view to show a stage scanning mechanism in the X-direction in Embodiment 2 of the present invention.
Figure 8:
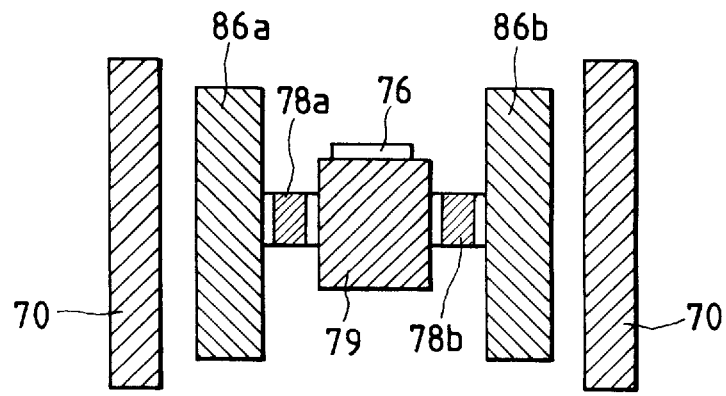
FIG. 8 is a sectional view to show the stage scanning mechanism in the X-direction in Embodiment 2 of the present invention.

Now, the scanning mechanism is explained in detail referring to FIG. 7 and FIG. 8.

FIG. 7 is a plan view of the X-directional drive mechanism portion of stage 79 and FIG. 8 is a cross section along 8—8 in FIG. 7.

The probe units 76 are fixed on the XY stage 79, which is an oscillator having moving directions restricted by parallel hinges 85 fixed at one ends thereof to a support member 70, and the stage 79 is connected through a piezoelectric device 78a for supplying oscillation energy thereto to a weight 86a and through a piezoelectric device 78b for detecting displacement thereof to a weight 86b. The stage 79 oscillates when the piezoelectric device 78a repeats expansion and contraction. The weight 86a has a larger inertial mass than the stage 79 has, and thus, almost all oscillation energy of expansion and contraction of the piezoelectric device 78a is transmitted to the stage 79.

Oscillation of the stage 79 is also transferred to the piezoelectric device 78b. Since the piezoelectric device 78b is also supported at one end by the weight 86b, almost all oscillation of the stage 79 is used to expand and contract the piezoelectric device 78b because of a great difference of inertial mass.

When this scanning mechanism is first started, the weights 86a, 86b are stationary.

When an oscillation voltage is applied to the piezoelectric device 78a, the stage 79 starts vibrating as described above. The oscillating state of the stage 79 is detected with the piezoelectric device 78b, and the frequency of oscillation of drive is controlled so that a phase difference between a drive phase of the piezoelectric device 78a and a detection phase of the piezoelectric device 78b may become the resonance condition of oscillator stage 79.

When the scanning mechanism satisfies the resonance condition, the weights 86a, 86b also start vibrating, and the stage 79 and weights 86a, 86b come to be displaced substantially in the same phase.

The oscillation at this moment is very stable and the oscillation energy supplied from the piezoelectric device 78a is minimum.

The Y-directional drive mechanism (not shown) also has the same structure.

However, the drive phase of the piezoelectric device for supplying Y-directional oscillation energy, corresponding to the piezoelectric device 78a of the X-directional drive mechanism, is controlled to lead by $\pi/2$ the phase detected by the piezoelectric device 78b. Except for this point the drive method is also the same.

The X-, Y-directional drive mechanisms as described above move the stage 79 in a circular motion in the XY plane.

Figure 6:
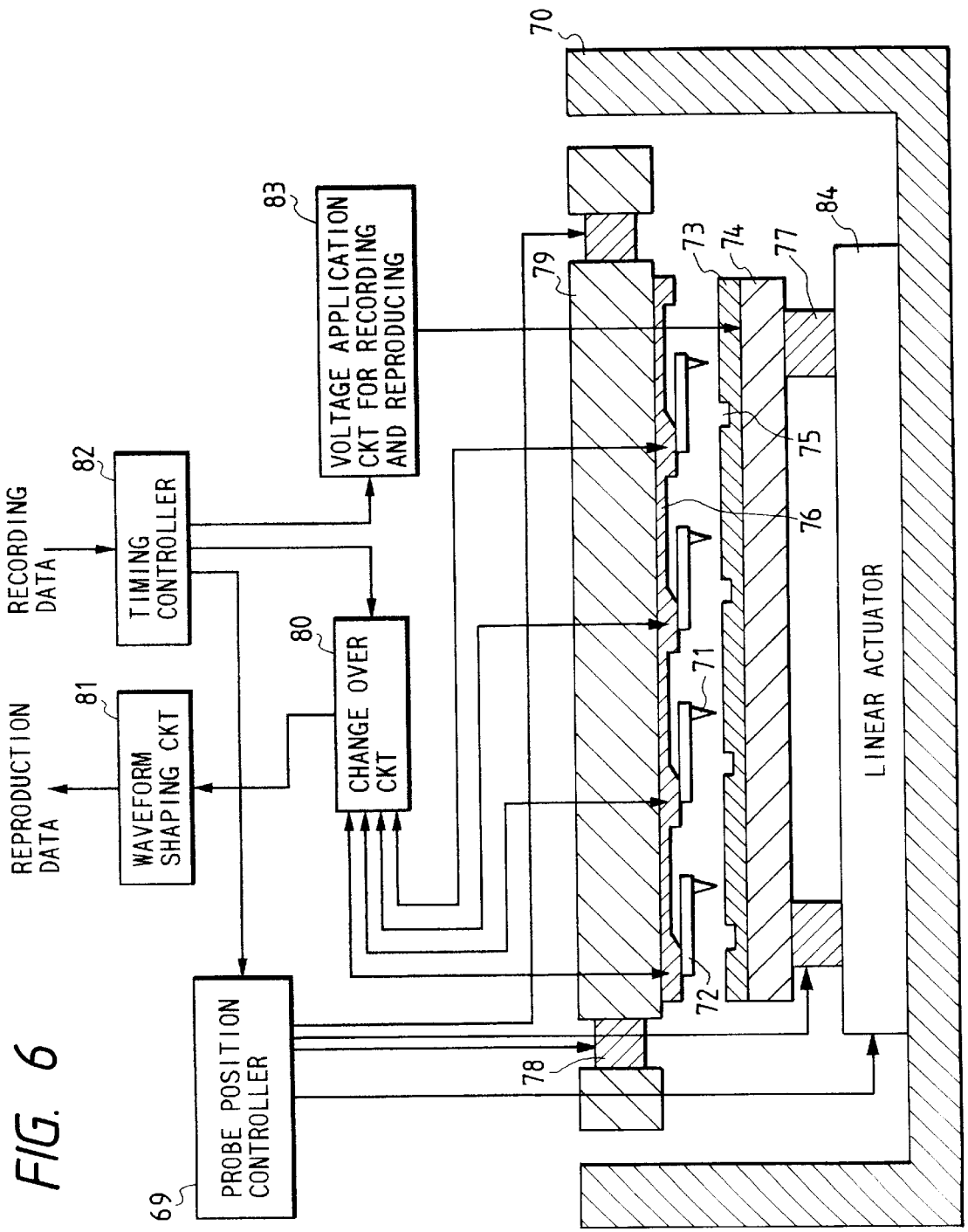
FIG. 6 is a conceptual drawing to show a setup of a memory block in Embodiment 2 of the present invention.

On the other hand, as shown in FIG. 6, the linear actuator 84 provided on the recording medium side linearly displaces the recording medium 73 together with the substrate 74 and Z-directional drive element 77 in the X or Y direction.

Figure 9:
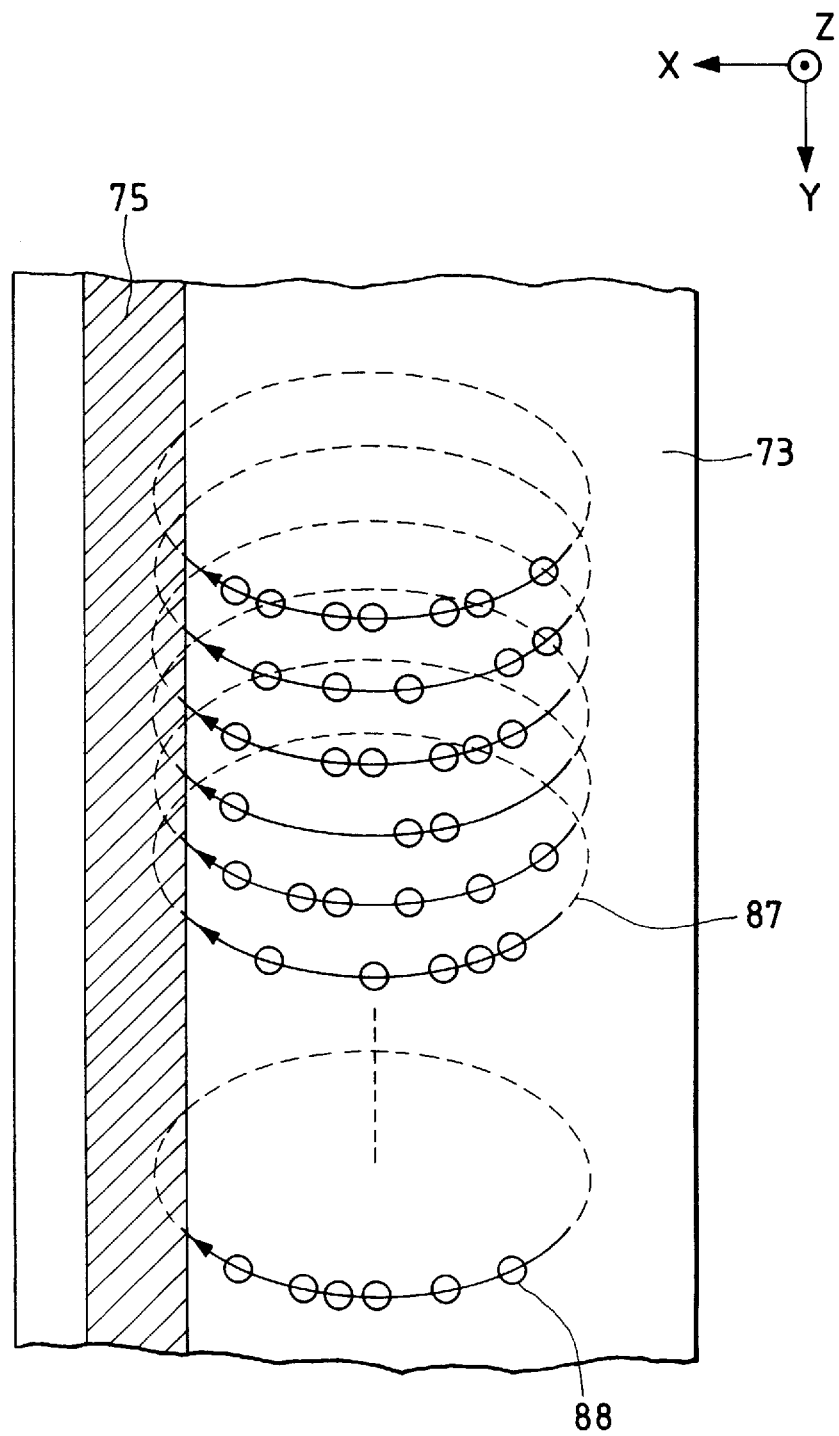
FIG. 9 is a conceptual drawing to show a locus of probe scanning in Embodiment 2 of the present invention.

When the recording medium 73 is linearly displaced in the Y direction in synchronization with the above rotational motion, a relative displacement can be realized between the probe electrodes 71 and the recording medium 73, as shown by probe loci 87 in FIG. 9.

In FIG. 9, numeral 75 denotes a tracking groove, and 88 are bits recorded on the recording medium 73. Similarly as in Embodiment 1, solid lines of the probe loci 87 correspond to durations for performing recording or reproducing processing. Durations other than the recording or reproducing processing durations, or durations when the probe is relatively translated, are dead times in which no recording or reproducing processing is carried out.

In the present embodiment, the memory block shown in FIG. 5 is divided into two or more groups, specifically into three groups, and the groups are operated in phases of drive shifted $2\pi/3$ from each other so as to cancel the above dead times occurring in the respective groups.

These are all controlled by the probe position controller 69.

The recording and/or reproducing apparatus of the embodiment of the present invention as described above performs recording with 1920 probes, at the rotational scanning frequency 500 Hz, in the main scanning width 1 $\mu$m, in the bit diameter 5 nm, and in the density of bit separations 10 nm, and has the recording or reproducing speed of 192 Mbps as the entire apparatus and that of 100 kHz per unit.

In the recording and/or reproducing apparatus as described, the energy of probe scanning drive is extremely reduced and the bit intervals on the recording medium are equal, which is the same as in Embodiment 1. In addition to the signal intervals upon recording, bit signals detected upon reproduction are also given at constant time intervals, and thus, multiplexing control of signal processing systems can be readily realized as shown by the present embodiment.

What is claimed is:

1. An information processing apparatus for performing at least one of recording and reproduction of information while two-dimensionally scanning a recording medium with a probe, utilizing a physical phenomenon occurring between said probe and said medium, comprising:

a scanning mechanism for effecting relative movement between said probe and said medium so as to to draw a circular or elliptic locus on said medium by said probe while linearly translating said locus; and a recording and/or reproducing circuit for performing at least one of said recording and reproduction of information, utilizing said physical phenomenon during said relative movement.

2. The information processing apparatus according to claim 1, wherein said scanning mechanism comprises a first scanning mechanism for moving said probe along the circular or elliptic locus and a second scanning mechanism for translating said medium.

3. The information processing apparatus according to claim 2, wherein said second scanning mechanism translates said medium stepwise.

4. The information processing apparatus according to claim 2, wherein said second scanning mechanism translates said medium in a continuous manner.

5. The information processing apparatus according to claim 1, wherein said recording and/or reproducing circuit performs at least one of said recording and reproduction of information only in a part of said circular or elliptic locus.

6. The information processing apparatus according to claim 1, wherein said probe is a plurality of probes.

7. The information processing apparatus according to claim 6, wherein said plurality of probes are separated into a plurality of groups and said groups have different drive phases of said scanning mechanism from each other.

8. The information processing apparatus according to claim 1, wherein said physical phenomenon is occurrence of a tunnel current.

9. The information processing apparatus according to claim 1, wherein said physical phenomenon is an interatomic force.

* * * * *

UNITED STATES PATENT AND TRADEMARK OFFICE
CERTIFICATE OF CORRECTION

PATENT NO. : 5,831,961
DATED : November 3, 1998
INVENTOR(S) : KUNIHIRO SAKAI ET AL.

Page 1 of 2

It is certified that error appears in the above-identified patent and that said Letters Patent is hereby corrected as shown below:

On the title page:

AT [56], REFERENCES CITED

Under FOREIGN PATENT DOCUMENTS,

"10006919" should read --10-006919--.

COLUMN 1

Line 16, "vivid." should read --active.--.
Line 27, "manometer" should read --nanometer--.
Line 49, "as" should be deleted.

COLUMN 2

Line 3, "as-a" should read --as a--.
Line 65, "an d" should read --and--.

COLUMN 5

Line 47, "monotonously" should read --monotonically--.

UNITED STATES PATENT AND TRADEMARK OFFICE
CERTIFICATE OF CORRECTION

PATENT NO. : 5,831,961

DATED : November 3, 1998

INVENTOR(S) : KUNIHIRO SAKAI ET AL.

It is certified that error appears in the above-identified patent and that said Letters Patent is hereby corrected as shown below:

COLUMN 7

Line 15, "with" should be deleted.

COLUMN 10

Line 2, "to to" should read --to--.

Signed and Sealed this

Seventeenth Day of August, 1999

Attest:

Q. TODD DICKINSON

Attesting Officer

Acting Commissioner of Patents and Trademarks